(12) United States Patent
Mildner et al.

(10) Patent No.: US 8,398,138 B2
(45) Date of Patent: Mar. 19, 2013

(54) BODY PART FOR A MOTOR VEHICLE

(75) Inventors: Udo Mildner, Limburg (DE); Jürgen Hulbert, Eltville (DE); Lothar Teske, Aschaffenburg (DE); Lutz Uhlenbruch, Herbstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 12/833,491

(22) Filed: Jul. 9, 2010

(65) Prior Publication Data

US 2011/0006561 A1    Jan. 13, 2011

(30) Foreign Application Priority Data

Jul. 10, 2009   (DE) .......................... 10 2009 032 603

(51) Int. Cl.
*B62D 21/15*    (2006.01)

(52) U.S. Cl. ..................... 296/29; 296/187.02; 296/204; 296/193.03

(58) Field of Classification Search .................... 296/29, 296/187.02, 203.01, 204, 193.03, 193.04
See application file for complete search history.

(56) References Cited

U.S. PATENT DOCUMENTS

| 5,605,353 | A | | 2/1997 | Moss et al. | |
|---|---|---|---|---|---|
| 6,146,071 | A | * | 11/2000 | Norkus et al. | 411/104 |
| 6,644,902 | B1 | * | 11/2003 | Cutshall | 411/111 |
| 7,188,877 | B2 | * | 3/2007 | Gonzalez et al. | 293/133 |
| 7,785,054 | B2 | * | 8/2010 | Parisi et al. | 411/338 |
| 2006/0006695 | A1 | | 1/2006 | Lutz et al. | |
| 2009/0167054 | A1 | | 7/2009 | Niezur et al. | |

FOREIGN PATENT DOCUMENTS

| DE | 3345576 | A1 | 6/1985 |
|---|---|---|---|
| DE | 19830026 | A1 | 1/2000 |
| DE | 19858903 | A1 | 6/2000 |
| DE | 60025098 | T2 | 9/2006 |
| DE | 102005016994 | A1 | 10/2006 |
| WO | 2010018190 | A1 | 2/2010 |

* cited by examiner

*Primary Examiner* — Joseph Pape
(74) *Attorney, Agent, or Firm* — Ingrassia Fisher & Lorenz, P.C.

(57) ABSTRACT

A body part of a front frame of a motor vehicle has a structural component of plastic arranged in a frame part. The structural component is connected with a cage nut through material connection. Via the cage nut a front axle is screwed to the body part. A carrying part for holding the cage nut is welded to the frame part for this purpose and connected to the structural component via over molding.

11 Claims, 2 Drawing Sheets

ABody PART FOR A MOTOR VEHICLE

CROSS-REFERENCE TO RELATED APPLICATION

This application claims priority to German Patent Application No. 102009032603.0, filed Jul. 10, 2009, which is incorporated herein by reference in its entirety.

TECHNICAL FIELD

The invention relates to a body part for a motor vehicle with a frame part of metal and a structural component of plastic arranged in the frame part and with a screw connection for fastening an additional component to the frame part.

BACKGROUND

A body part is known as roof spar for example from DE 198 58 903 A1 and serves for the partial reinforcement of the frame part in the region of pillars of the body of the motor vehicle. The structural component is designed as stiff mass and has a plurality of protrusions with which it supports itself on the inner wall of the roof spar. Positioning of the stiff mass takes place via humps supporting in the pillars. Furthermore, the stiff mass has depressions in the region of screw connections of the frame part. Fastening of a further component is thus exclusively performed on the frame part.

Disadvantageous with the known body part is that the structural component only brings about minor stiffening of the frame part since for example all forces of the component screwed to the body part are directly introduced into the frame part. In addition, the protrusions and the humps hinder coating of the roof spar in a dipping basin.

SUMMARY

The embodiments of the invention are based on the problem of further developing a body part of the type mentioned at the outset so that it is of a high stiffness and able to support high forces.

Accordingly, this problem is solved in that the screw connection has a cage nut untwist ably guided in a carrying part and that the carrying part is connected to the structural component and to the frame part.

Through this configuration fastening of the structural component takes place directly on the screw connection. Because of this, the screw connection is additionally supported by the structural component. The body part according to an embodiment of the invention is of a particularly high stiffness as a result. Thus, the body part is preferably suitable as longitudinal member of a front frame for fastening a front axle as additional component. Furthermore, the body part does not require any humps or the like since positioning of the structural component in the frame part takes place via the carrying part and the cage nut. Thus the body part additionally is of a particularly simple construction.

The manufacture of the body part according to an embodiment of the invention is particularly simple if the carrying part is materially connected with the structural component through over molding with plastic. As a result, a constructional unit of carrying part and structural component can initially be manufactured. The structural component of plastic is subsequently mounted to the frame part with the mounting of the cage nut. Over molding of the carrying part with plastic is preferentially effected by inserting the carrying part into an injection mould of the structural component and guarantees particularly high stability of the joining of the carrying part to the structural component.

Particularly high stability of the joining of the carrying part of the cage nut to the frame part can be ensured according to another advantageous further embodiment of the invention if the carrying part comprises flanges contacting the frame part and if the flanges and the frame part are connected to one another via structural connections. The structural connections are preferentially generated through welding, riveting, bonding and/or clinching.

The fastening of the carrying part to the frame part is accessible from both sides according to another advantageous further embodiment of the invention if the structural component of plastic has clearances for the flanges of the carrying part of the cage nut. Through this configuration the fastening of the carrying part to the frame part can be created particularly cost-effectively by means of welding tongs.

The cage nut can be stabilized against high loads in transverse direction of the body part according to an embodiment of the invention if two ribs of plastic arranged distant from the lateral edge of the structural component and immediately next to the cage nut are arranged in longitudinal direction of the structural component.

Particularly high stability of the screw connection with the additional component can be simply ensured according to another advantageous further embodiment of the invention if the carrying part has a sleeve which is arranged concentrically to the intended screw axis of the cage nut and if the sleeve supports itself on the frame part.

The flanges for connecting the carrying part to the frame part can for example be angled off the sleeve. However, according to another advantageous further embodiment of the invention the carrying part has a large adhering area for the plastic of the structural component if the sleeve is connected to the flanges of the carrying part via straps.

A contribution to further enlarge the adhering area for the plastic of the structural component on the carrying part according to another advantageous further embodiment of the invention is if the straps are fastened to the sleeve on the end facing the cage nut.

The body part completely assembled with frame part, structural component and cage nut can be simply painted in or corrosion protected in a dip bath if the structural component is spaced from the frame part. For the spacing of the structural component from the frame part a gap is frequently sufficient.

In the region of the cage nuts the structural component is reliably supported on the frame part and can thus support forces. One could think of nevertheless arranging additional cage nuts for supporting the structural component on the frame part on ends of the structural component on which no screw connections are provided. However, this results in excessively high manufacturing costs and high weight of the body part. According to another advantageous further embodiment of the invention, the body part has a low weight and can be manufactured cost-effectively if the structural component in a region distant from the cage nut is supported against the frame part with foam expanding with heat. The foam expanding through heat is preferentially applied before inserting the body part in the dip bath and can subsequently expand in a drying oven.

The structural component according to another advantageous further embodiment of the invention comprises particularly high stability if the structural component is configured tub-shaped with a multiplicity of transversely arranged ribs.

BRIEF DESCRIPTION OF THE DRAWINGS

The present invention will hereinafter be described in conjunction with the following drawing figures, wherein like numerals denote like elements, and FIG. 1 perspectively a front frame for a motor vehicle with a body part according to an embodiment of the invention and adjoining front axle.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
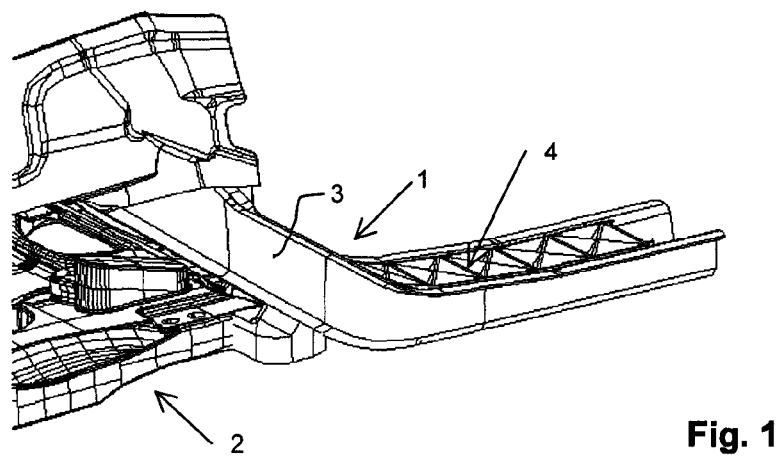

FIG. 1 shows a part region of a front frame of a motor vehicle with a front axle 2 screwed to a body part 1 designed as longitudinal member. The body part 1 has a tub-shaped frame part 3 of sheet metal and a structural component 4 of plastic inserted therein.

Figure 2:
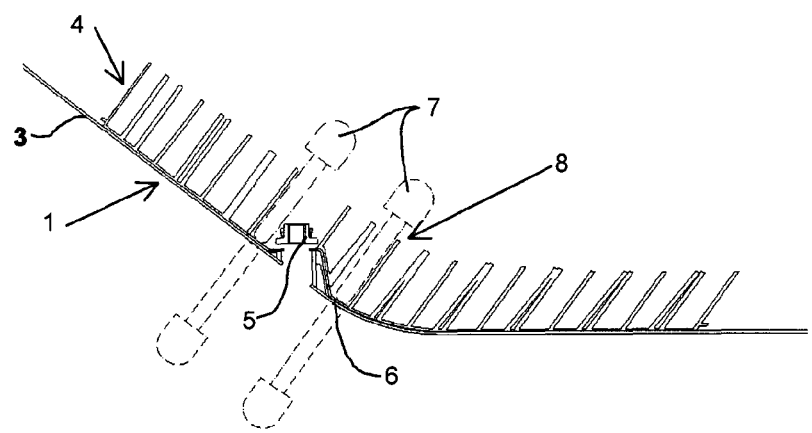
FIG. 2 a longitudinal section through the body part from FIG. 1.

FIG. 2 shows a longitudinal section through the body part 1 from FIG. 1 with the structural component 4 and a cage nut 5 during assembly. The cage nut 5 is held untwist ably but slightly moveably in a carrying part 6. The carrying part 6 is positively connected with the structural component 4 through over molding with plastic. Furthermore, welding tongs 7 for welding the carrying part 6 to the frame part 3 are shown in dashed lines in FIG. 2. The structural component 4 has clearances 8 for passing the welding tongs 7 through to the carrying part 6.

Figure 3:
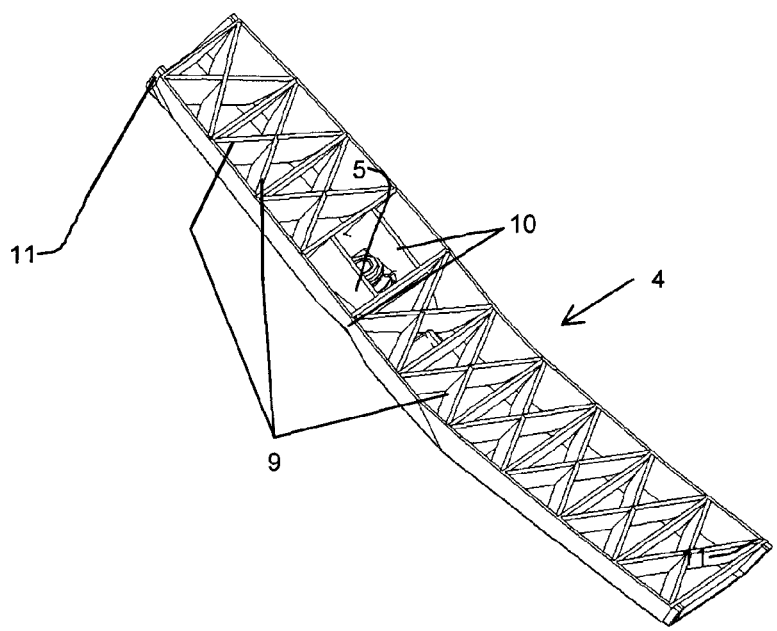
FIG. 3 a structural component of the body part from FIG. 1.

FIG. 3 perspectively shows the structural component 4 with the cage nut 5 prior to the assembly on the frame part 3. The structural component 4 forms a constructional unit with the cage nut 5 and the carrying part 6, which during final assembly is inserted in the tub-shaped frame part 3 and fastened as described with respect to FIG. 2. The structural component 4 is likewise of tub-shaped configuration and has a multiplicity of ribs 9 arranged in top view diamond-shaped and transversely to its longitudinal direction. Near to the cage nut 5 the structural component 4 has ribs 10 spaced from the lateral limitation and facing in longitudinal direction. The structural component 4 at its ends is provided with foam 11 expanding through heat. In the assembled state the structural component 4 supports itself at these points on the frame part 3 via the foam 11.

Figure 4:
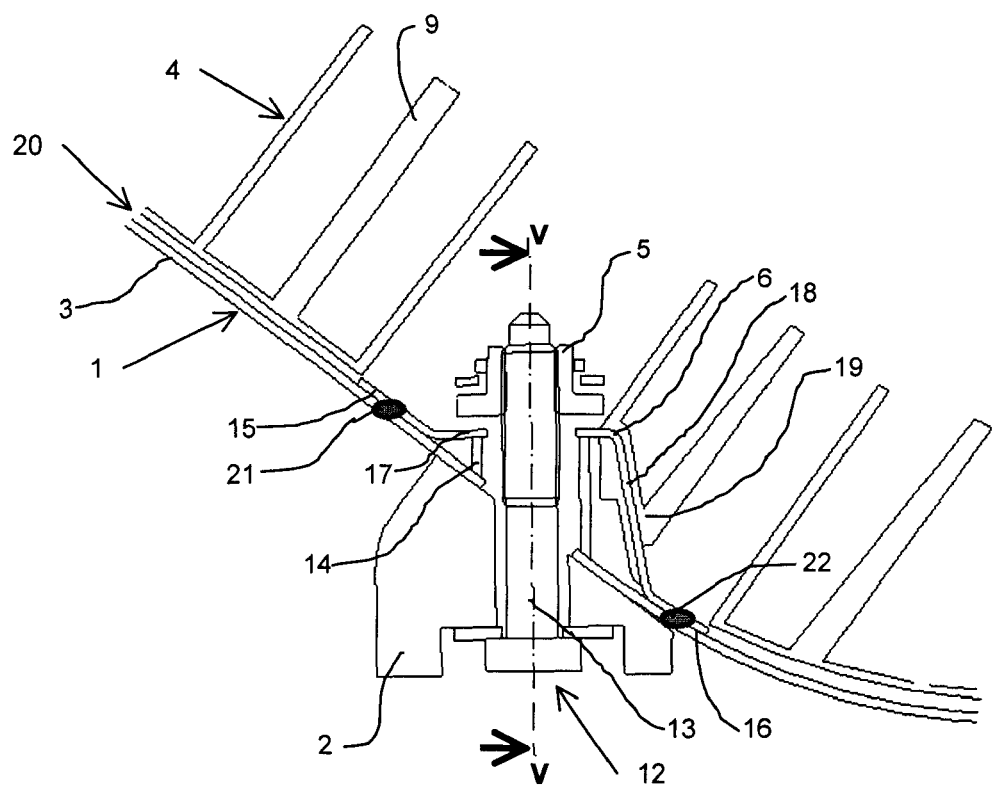
FIG. 4 enlarged a longitudinal section through a screw connection of the body part from FIG. 1.

FIG. 4 shows enlarged a sectional representation through a screw connection 12 for screwing the body part 1 from FIG. 1 to the front axle 2. Here it is noticeable that a screw 13 is passed through the frame part 3 and turned into the cage nut 5. The carrying part 6 comprises a sleeve 14 arranged concentrically to the screw 13 of the screw connection 12 and flanges 15, 16 welded to the frame part 3. The flanges 15, 16 are connected with the end of the sleeve 14 facing away from the frame part 3 via straps 17, 18. The fastening of the flanges 15, 16 to the frame part 3 has welding points designed as structural connections 21, 22. It is also clearly noticeable in FIG. 4 that the plastic of the structural component 4 has an over molding 19 enclosing the straps 17, 18 of the carrying part 6. Between the structural component 4 and the frame part 3 a small gap 20 is arranged, which makes possible directing a corrosion protection in the dip basin to the frame part 3.

Figure 5:
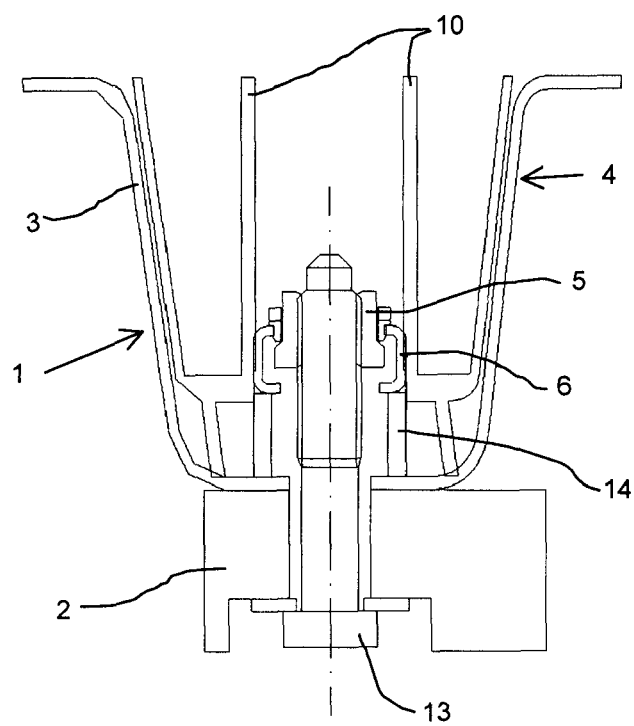
FIG. 5 a further sectional representation through the screw connection of the body part from FIG. 4 along the line V-V.

FIG. 5 shows a further sectional representation of the screw connection 12 from FIG. 4 along the line V-V for clarification. The tub-shape of the frame part 3 is clearly noticeable here.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body part for a motor vehicle, comprising:
   a frame part of metal;
   a structural component of a plastic arranged in the frame part; and
   a screw connection for fastening a further component to the frame part, the screw connection comprising a cage nut that is untwistably guided in a carrying part and the carrying part is connected to the structural component and to the frame part.

2. The body part according to claim 1, wherein the carrying part is connected to the structural component by a material connection through a plastic over molding.

3. The body part according to claim 1, wherein the carrying part comprises a flange contacting the frame part, and wherein the flange and the frame part are connected by a structural connection.

4. The body part according to claim 3, wherein the structural component of the plastic has a clearance for the flange of the carrying part of the cage nut.

5. The body part according to claim 1, wherein two ribs of plastic are arranged distant from a lateral edge of the structural component and directly next to the cage nut, and wherein the two ribs of plastic are arranged in a longitudinal direction of the structural component.

6. The body part according to claim 3, wherein the carrying part comprises a sleeve that is arranged concentrically to an intended screw axis of the cage nut and the sleeve supports itself on the frame part.

7. The body part according to claim 6, wherein the sleeve is connected to the flange of the carrying part with a strap.

8. The body part according to claim 7, wherein the strap is fastened to the sleeve on an end facing the cage nut.

9. The body part according to claim 1, wherein the structural component is spaced from the frame part.

10. The body part according to claim 1, wherein the structural component in a region distant from the cage nut is supported with respect to the frame part with a heat expanding foam.

11. The body part according to claim 1, wherein the structural component is a tub-shape with a plurality of transversely arranged ribs.

* * * * *